US008978309B2

(12) United States Patent
Goto (10) Patent No.: US 8,978,309 B2
(45) Date of Patent: Mar. 17, 2015

(54) HOOK MEMBER FOR VEHICULAR DOOR SASH AND VEHICULAR DOOR SASH INCLUDING THE SAME

(71) Applicant: Honda Motor Co., Ltd., Tokyo (JP)

(72) Inventor: Joji Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/959,817

(22) Filed: Aug. 6, 2013

(65) Prior Publication Data

US 2014/0059942 A1 Mar. 6, 2014

(30) Foreign Application Priority Data

Aug. 31, 2012 (JP) .................. 2012-191031

(51) Int. Cl.
| | | |
|---|---|---|
| *E05F 11/38* | (2006.01) | |
| *E06B 9/42* | (2006.01) | |
| *B60J 5/04* | (2006.01) | |
| *B60J 1/20* | (2006.01) | |

(52) U.S. Cl.
CPC .............. *E06B 9/42* (2013.01); *B60J 5/0402* (2013.01); *B60J 1/2047* (2013.01)
USPC ............ 49/502; 49/493.1; 296/143; 296/145; 296/139; 160/370.22

(58) Field of Classification Search
USPC ............... 49/502, 493.1; 160/370.22, 105; 296/143, 145, 139; 24/457, 369; 403/397
See application file for complete search history.

(56) References Cited

U.S. PATENT DOCUMENTS

| | | | | |
|---|---|---|---|---|
| 5,358,299 A * | 10/1994 | Seto | .......................... | 296/97.9 |
| 5,560,669 A * | 10/1996 | Gute | ........................... | 296/97.9 |
| 5,765,896 A * | 6/1998 | Grisval | ....................... | 296/97.9 |
| 6,347,775 B1 * | 2/2002 | Edlinger | ...................... | 248/266 |
| 7,401,840 B2 * | 7/2008 | Schnoblen et al. | .......... | 296/143 |
| 7,438,341 B1 * | 10/2008 | Olson, Jr. | .................... | 296/97.9 |
| 7,762,021 B2 * | 7/2010 | Fujiwara et al. | ............... | 49/502 |
| 8,141,832 B2 * | 3/2012 | Chak | ........................ | 248/226.11 |
| 8,579,010 B2 * | 11/2013 | Medlar et al. | .............. | 160/368.1 |
| 2005/0223648 A1 * | 10/2005 | Takeuchi et al. | ............... | 49/502 |
| 2008/0141501 A1 * | 6/2008 | Kuroda | .......................... | 24/297 |

FOREIGN PATENT DOCUMENTS

JP 3566549 B2 9/2004

* cited by examiner

*Primary Examiner* — Katherine Mitchell
*Assistant Examiner* — Marcus Menezes
(74) *Attorney, Agent, or Firm* — Westerman, Hattori, Daniels & Adrian, LLP (57) ABSTRACT

A door-sash hook member is attached to a surface of a door sash of a vehicular door. The door-sash hook member includes a superposed surface superposed on the surface of the door sash, and a circumferential wall surface standing from the superposed surface to form a circumferential edge of the superposed surface. At least a part of the circumferential wall surface is a welded face weldable to the surface of the door sash with a welding material. The circumferential wall surface includes a projecting portion adjacent to the welded face, and the projecting portion protrudes outwardly compared to the welded face along a plane of the superposed surface.

22 Claims, 8 Drawing Sheets

HOOK MEMBER FOR VEHICULAR DOOR SASH AND VEHICULAR DOOR SASH INCLUDING THE SAME

CROSS REFERENCES TO RELATED APPLICATIONS

The present application claims priority under 35 U.S.C. §119 to Japanese Patent Application No. 2012-191031, filed Aug. 31, 2012, entitled "Hook Member for Vehicular Door Sash and Vehicular Door Sash Including the Hook Member." The contents of this application are incorporated herein by reference in their entirety.

TECHNICAL FIELD

The present disclosure relates to improvement techniques of a hook member for a vehicular door sash and a vehicular door sash including the hook member.

BACKGROUND

In recent years, there has been developed a technique of providing a roller curtain in a vehicle side door to block sunlight entering a cabin through a window glass of the vehicular side door. When the roller curtain is used, it is withdrawn and a distal end thereof is hung on a hook member fixed to a door sash (see, for example, Japanese Patent No. 3566549 (FIG. 1)).

The roller curtain described in the above publication is retracted and stored near an upper edge of a door body of the vehicular side door, and is hung on the hook members attached to a door sash of the vehicular side door.

Preferably, the hook members thus used are firmly fastened to the door sash. For that purpose, it is conceivable to fasten the hook members by screwing. Here, the door sash can have two types of structures. A first structure is a so-called press sash structure in which a closed cross section is formed by joining both ends of two press-molded plates. A second structure is a so-called roller sash structure in which a closed cross section is formed by roll-forming one plate.

Inexpensive roller sashes have recently been in heavy usage. However, to screw hook members to a roller sash, it is necessary to form screw holes in the roller sash of closed cross section later. Since the roller sash has a closed cross section, it cannot be supported from the inside and becomes bent during formation of the holes. That is, the roll sash is difficult to process.

It is conceivable to attach each hook member to the roller sash by MIG welding. However, when only MIG welding is performed, a weld bead may become protuberant from the hook member. Although the protuberant weld bead can be scraped off with a grinder or the like to improve the appearance of the door, the grinder should be prevented from contact with the roller sash. It is preferable to perform the scraping operation easily and reliably.

SUMMARY

The present application describes a hook member for a vehicular door sash with good appearance.

A vehicular door-sash hook member according to an aspect of the present disclosure is attached to a surface of a door sash of a vehicular door. The vehicular door-sash hook member includes a superposed surface superposed on the surface of the door sash, and a circumferential wall surface standing from the superposed surface to form a circumferential edge of the superposed surface. At least a part of the circumferential wall surface is a welded face weldable to the surface of the door sash with a welding material. The circumferential wall surface includes a projecting portion adjacent to the welded face, and the projecting portion protrudes outwardly compared to the welded face along a plane of the superposed surface.

In this case, the circumferential wall surface has the projecting portion adjacent to the welded face, and the projecting portion protrudes outwardly compared to the welded face along the plane of the superposed surface. The vehicular door-sash hook member is welded to the door sash with the welding material. When the vehicular door-sash hook member is welded to the door sash, a weld bead is normally formed to reach a position higher than the welded face. A portion of the weld bead formed at the position higher than the welded face is scraped off with a grinder or the like. If the grinder is tilted during scraping, it comes into contact with an upper surface of the projecting portion. That is, the grinder can be prevented by the upper surface of the projecting portion from tilting. By preventing the grinder from tilting, the height of the weld bead can be made flush with the height of the welded face. By making the weld bead flush with the welded surface, the design can be improved.

Further, by being prevented from tilting, the grinder can be prevented from contact with the door sash, and a contact mark of the grinder can be prevented from remaining on the surface of the door sash.

In addition, in this aspect, the welded face is provided which is weldable to the surface of the door sash with the welding material. That is, the vehicular door-sash hook member is attached to the door sash by welding. Since the vehicular door-sash hook member can be attached without forming a mounting hole in the door sash, it can also be attached to a roll-formed door sash. That is, the vehicular door sash hook member can be attached regardless of the production method for the door sash.

The roll-formed door sash is less expensive than a press-formed door sash. Because inexpensive door sash is used above the door body, the production cost for the vehicular door can be reduced.

Preferably, the projecting portion is provided on the both sides of the welded face along the circumferential wall surface.

In this case, since the projecting portion is provided on the both sides of the welded face along the circumferential wall surface, the grinder can be more reliably prevented from contact with the door sash.

Preferably, the welded face is bent such that both ends of the welded face in a direction along the circumferential wall surface protrude outwardly compared to a center portion along the plane of the superposed surface.

In this case, the welded face is bent such that both ends of the welded face in the direction along the circumferential wall surface protrude outwardly compared to the center portion along the plane of the superposed surface. That is, both ends of the welded face extend outward from the center portion in different directions. External force is sometimes applied in a direction in which the vehicular door-sash hook member separates from the door sash. This external force is also applied to a weld bead that joins the hook member to the door sash. Since both ends of the welded face extend from the center portion in different directions, both ends of the weld bead also extend from a center portion in different directions. Since both ends of the weld bead protrude in different directions, the force applied in the direction to separate the weld bead is cancelled in the weld bead. This cancellation can reduce the load applied to the weld bead, and can prevent the hook member from separating from the door sash.

In addition, since the welded face is inclined such that both ends in the direction along the circumferential wall surface protrude outwardly compared to the center portion along the plane of the superposed surface, the welding material can be prevented from flowing to the outside of the projecting portion.

Preferably, the hook member further includes an extending portion provided in a portion opposite to the welded face of the circumferential wall surface, and a hook portion provided in the extending portion. The extending portion extends toward a direction opposite to the welded face, and is inclined in a direction away from the surface of the door sash when the superposed surface is superposed on the surface of the door sash.

In this case, the extending portion extends toward the direction opposite to the welded face, and is inclined in the direction away from the surface of the door sash when the superposed surface is superposed on the surface of the door sash. This can prevent the extending portion from interfering with a grinder when the weld bead is scraped off with the grinder. By preventing the interference, the vehicular door-sash hook member can be attached easily.

Preferably, the hook portion points from the extending portion toward the welded face.

In this case, the hook portion points from the extending portion toward the welded face. This allows the hook portion to be aligned with the welded face in the up-down direction, and can reduce the total size of the hook member in the door width direction.

A door sash for a vehicular door according to another aspect of the present disclosure includes the above hook member, a sash body of closed cross section, and an angular U-shaped sectional portion that supports a run channel configured to guide a door glass. The angular U-shaped sectional portion is provided to the sash body, and the welded face is provided on and welded to the surface of the vehicular door sash such as to be adjacent to an opening of the angular U-shaped sectional portion.

In this case, the welded face is provided on and welded to the surface of the door sash such as to be adjacent to the opening of the angular U-shaped sectional portion provided in the sash body. Since the welded face is adjacent to the opening of the angular U-shaped sectional portion, it can be located close to a relatively wide space. This allows welding of the welded face and scraping of the weld bead with the grinder to be performed easily.

BRIEF DESCRIPTION OF THE DRAWINGS

The advantages of the disclosure will become apparent in the following description taken in conjunction with the following drawings.

DETAILED DESCRIPTION

An embodiment of the present disclosure will be described below with reference to the attached drawings. In the description, right and left directions are determined on the basis of an occupant, and front and rear directions are determined on the basis of an advancing direction of a vehicle. In the drawings, Fr represents the front, Rr represents the rear, In represents an inboard direction, Out represents an outboard direction, Up represents an upper direction, and Dw represents a downward direction.

A structure of a vehicular door in which a door-sash hook member of the embodiment is attached will be described with reference to FIG. 1.

Figure 1:
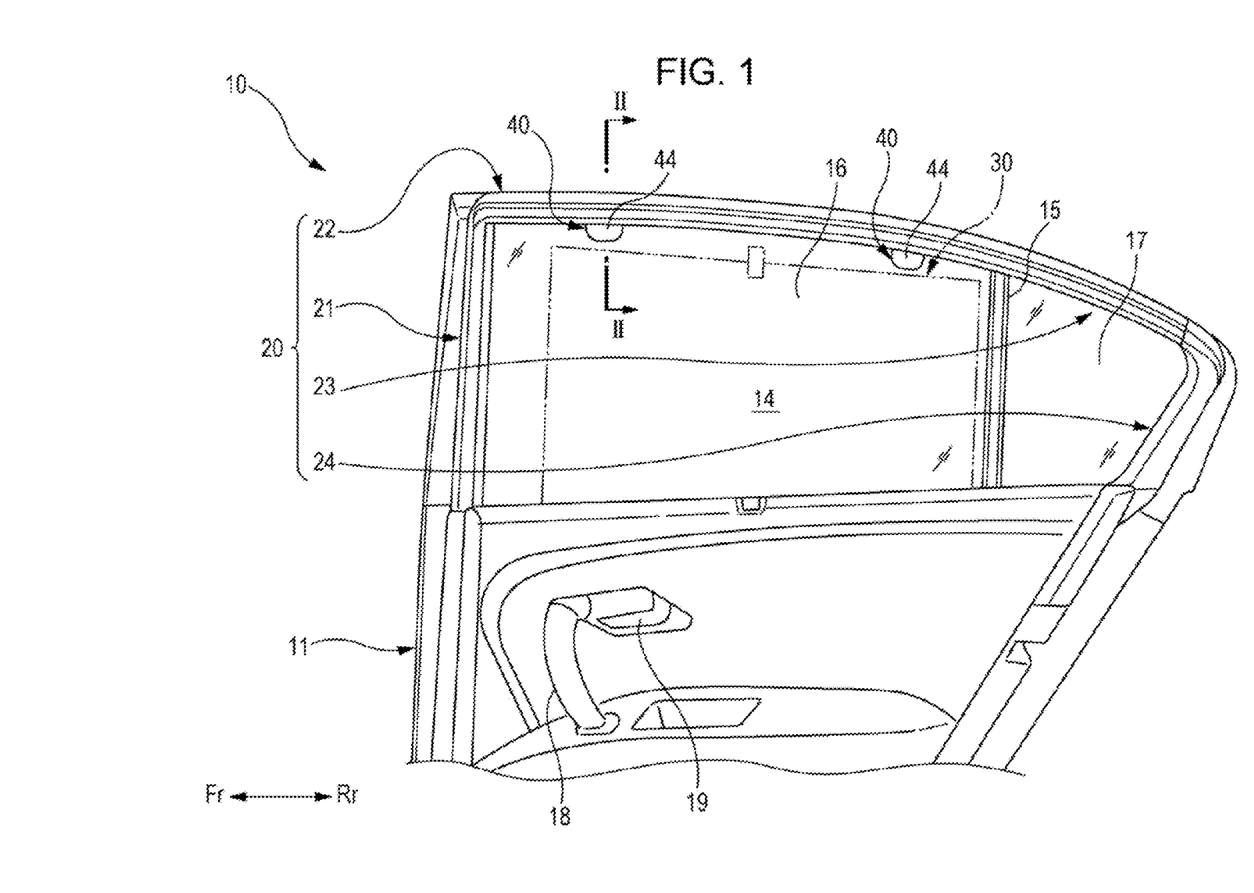
FIG. 1 is a side view of a vehicular door sash provided with door-sash hook members according to the present disclosure, showing an inboard side.

A vehicular door 10 illustrated in FIG. 1 is a right rear door of a vehicle body, and FIG. 1 is side view of the vehicular door 10 showing the inboard side. The vehicular door 10 includes a door body 11 swingably mounted in an opening formed in a rear part of the vehicle body, a door sash 20 provided above the door body 11, an auxiliary sash 15 that bisects a window opening 14 surrounded by the door sash 20 and the door body 11 (hereinafter referred to as an auxiliary sash 15), a movable glass window panel 16 attached in front of the auxiliary sash 15 such as to move up and down, and a fixed glass window panel 17 fixed at the rear of the auxiliary sash 15.

In the door body 11, a roller curtain 30 is stored in a rolled state. The roller curtain 30 is a retractable curtain used to block light from the outside. In a front part of the door body 11, a grip 18 used by the user to swing the vehicular door 10 and a lever 19 used by the user for unlocking are provided.

The door sash 20 is a metal window frame that forms a substantially pentagonal shape with an upper edge of the door body 11. The door sash 20 includes a front sash 21 extending in the up-down direction in front of the movable window panel 16, an upper front sash 22 extending rearward from an upper end of the front sash 21 to an upper portion of the auxiliary sash 15, an upper rear sash 23 sloping downward from a rear end of the upper front sash 22 along an upper edge of the fixed window panel 17, and a rear sash 24 extending toward the lower front from a rear end of the upper rear sash 23.

Figure 2:
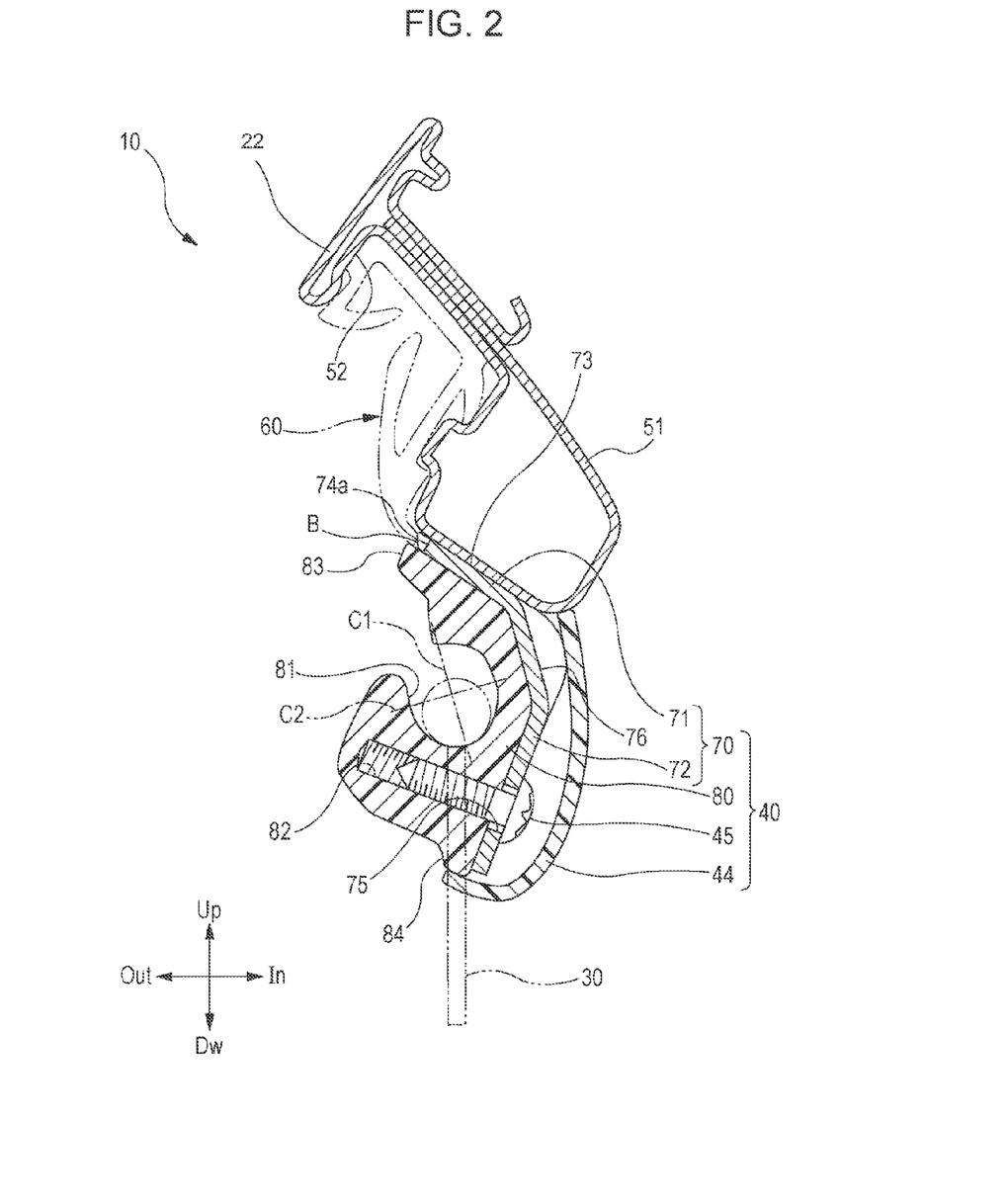
FIG. 2 is a cross-sectional view taken along line II-II of FIG. 1.

Door-sash hook members 40 to which the roller curtain 30 is to be engaged are joined to a lower surface of the upper front sash 22. With reference to FIG. 2 and subsequent figures, a front door-sash hook member 40 (hereinafter referred to as "a hook member 40") will be described in detail as an example. Since a rear door-sash hook member 40 has the same structure as that of the front hook member 40, a description thereof will be skipped.

As illustrated in FIG. 2, the upper front sash 22 is a roll-formed body of closed cross section formed by bending one steel plate. The upper front sash 22 includes a sash body 51 of closed cross section, and an angular U-shaped sectional portion 52 provided adjacent to the sash body 51 and opening in an angular U-shape. The angular U-shaped sectional portion 52 supports a run channel 60. The run channel 60 is a component for fixing an edge of the movable window panel 16 (FIG. 1).

Figure 3:
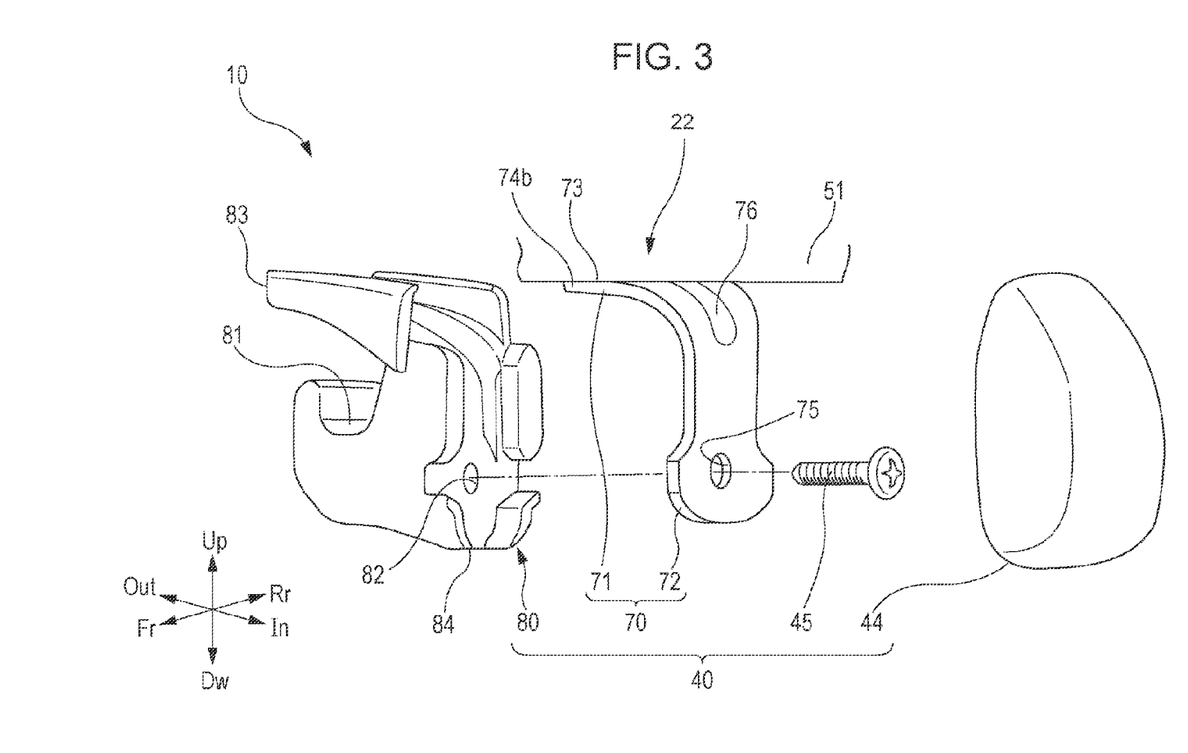
FIG. 3 is an exploded perspective view of the door-sash hook member illustrated in FIG. 1.

Also referring to FIG. 3, the hook member 40 includes a hook-member body 70 having a substantially L-shaped cross section and welded to the sash body 51, a first cover body 80 attached to a front side of the hook-member body 70 to cover the front side of the hook-member body 70, and a second cover body 44 attached to a back side of the hook-member body 70 to cover the back side of the hook-member body 70. The hook-member body 70 formed of metal is interposed between the first cover body 80 and the second cover body 44 that are formed of resin. The hook member 40 is joined to the upper front sash 22 with a weld bead B.

The hook-member body 70 and the first cover body 80 are fastened with a screw 45. The second cover body 44 is attached to the first cover body 80. For example, the second cover body 44 is attached to the first cover body 80 by engaging a claw provided on the second cover body 44 with a hole provided in the first cover body 80.

Figure 4:
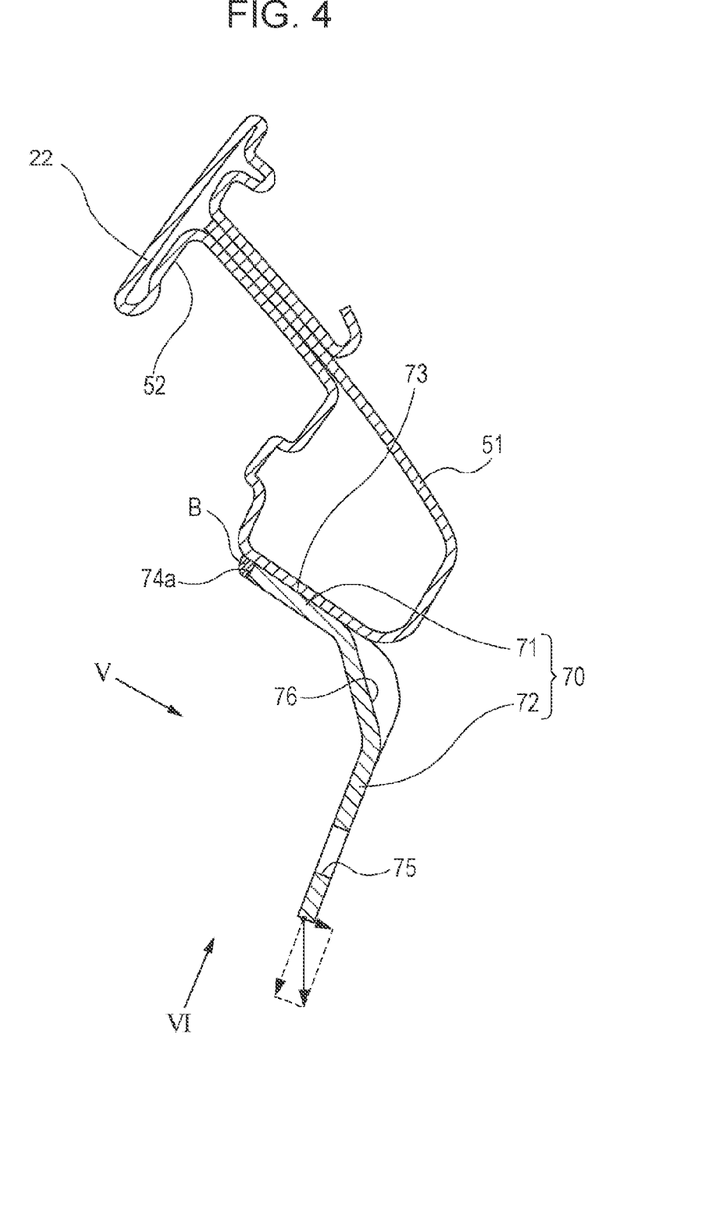
FIG. 4 illustrates the door-sash hook member of FIG. 2 from which a first cover member, a second cover member, and a screw are removed.
Figure 5:
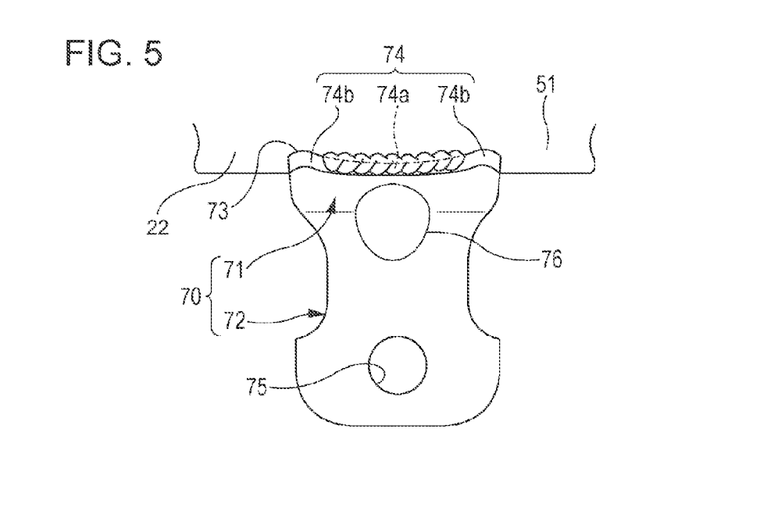
FIG. 5 is a view on arrow V of FIG. 4.
Figure 6:
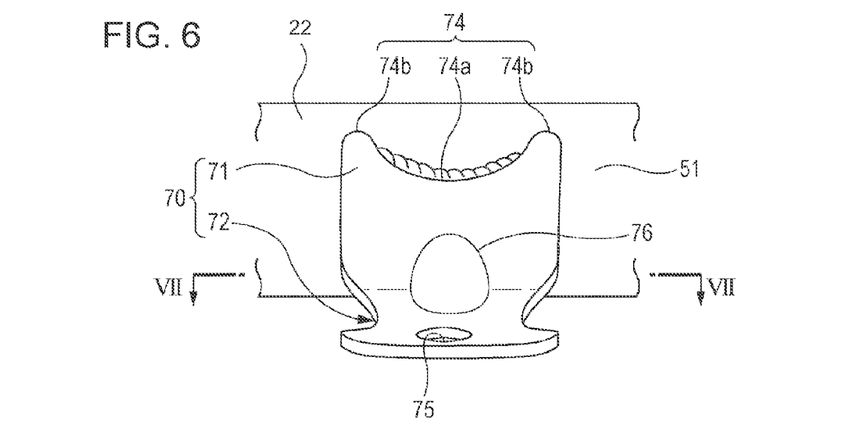
FIG. 6 is a view on arrow VI of FIG. 4.

As illustrated in FIGS. 4 to 6, the hook-member body 70 includes a joint portion 71 welded along the upper front sash 22, and an extending portion 72 extending from the joint portion 71.

The joint portion 71 includes a superposed surface 73 superposed on a surface of the upper front sash 22, and a circumferential wall surface 74 standing from the superposed surface 73 to form a circumferential edge of the superposed surface 73. A part of the circumferential wall surface 74 serves as a welded face 74a welded to the surface of the upper front sash 22. Projecting portions 74b project outward along the plane of the superposed surface 73 from opposite ends of the welded face 74a.

The extending portion 72 extends from an end of the joint portion 71 opposite to the welded face 74a, and is obliquely raised away from the welded face 74a. In a portion near a distal end of the extending portion 72, a hole 75 in which the screw 45 (FIG. 3) is inserted is provided. Also referring to FIG. 7, a hook-member bead 76 is provided at a widthwise center of a boundary portion between the extending portion 72 and the joint portion 71. By forming the hook-member bead 76, the strength of the hook-member body 70 is increased. The welded face 74a is located on the surface of the upper front sash 22 such as to be adjacent to the opening of the angular U-shaped sectional portion 52.

Figure 7:
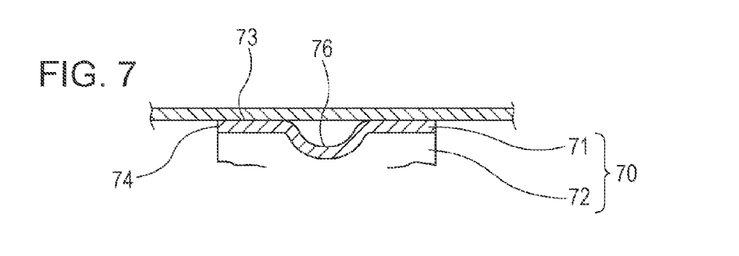
FIG. 7 is a cross-sectional view, taken along line VII-VII of FIG. 6.

By being located adjacent to the opening of the angular U-shaped sectional portion 52 of the door sash 20, the welded face 74a can be placed closer to a comparatively wide space. By locating the welded face 74a closer to a wide space, welding of the welded face 74a and scraping of the weld bead with a grinder can be performed easily. Details will be described below.

The welded face 74a is arc-shaped when the hook-member body 70 is viewed from above (see FIG. 6). That is, the welded face 74a is bent such that both ends of the welded face 74a in a direction along the circumferential wall surface 74 protrude outward compared to the center portion along the plane of the superposed surface 73.

Both ends of the welded face 74a project (extend) from the center portion in different directions. External force is sometimes applied in a direction in which the door-sash hook member 40 separates from the door sash 20 (see the arrow in FIG. 4). This external force is also applied to the weld bead B that joins the door-sash hook member 40 to the door sash 20. Since both ends of the welded face 74a project from the center portion in different directions, both ends of the weld bead B also project from the center portion in different directions. Since the weld bead B projects in different directions, a part of the force applied in the direction to separate the weld bead B is cancelled in the weld bead B. This cancellation can reduce the load applied to the weld bead B. Hence, the hook member 40 can be prevented from separating from the door sash 20.

In addition, particularly as illustrated in FIG. 6, since the welded face 74a is bent such that both ends of the welded face 74a in the direction along the circumferential wall surface 74 protrude outward compared to the center portion along the plane of the superposed surface, a welding material can be prevented from flowing out over the projecting portions 74b (see the weld bead B).

Returning to FIGS. 2 and 3, the first cover body 80 covering the front surface of the hook-member body 70 has a hook portion 81 on which the roller curtain 30 (engaged article 30) is hung, and an internal threaded hole 82 in which the screw 45 is screwed. The hook portion 81 is provided at a position corresponding to the extending portion 72 and on the angular U-shaped sectional portion 52 side.

The first cover body 80 is slightly larger than the hook-member body 70. That is, a distal end portion 83 of the first cover body 80 corresponding to the circumferential wall surface 74 of the hook-member body 70 protrudes from a distal end portion of the circumferential wall surface 74 of the hook-member body 70. Further, a distal end portion 84 of the first cover body 80 corresponding to the extending portion 72 of the hook-member body 70 protrudes from a distal end portion of the extending portion 72 of the hook-member body 70. The hook-member body 70 formed of metal is covered with the first cover body 80 formed of resin. By making the hook-member body 70 invisible, the appearance of the hook member 40 can be improved.

The hook portion 81 of the first cover body 80 extending from the extending portion 72 toward the welded face 74a is substantially oval which is partly open in a direction away from the hook-member body 70. In a state in which the hook member 40 is attached to the door sash 20, the opening of the hook portion 81 is located at the obliquely upper with respect to a portion where the roller curtain 30 is engaged. That is, the opening is not located on a directly above the portion. In addition, the oval hook portion 81 is inclined toward the opening with respect to the vertical axis.

By forming the opening such as not to be located above the roller curtain 30, the roller curtain 30 is prevented from erroneously falling off the hook portion 81, for example, because of vibration. In contrast, the roller curtain 30 is easily detached because the oval hook portion 81 inclined toward the opening can function as a guide. It is particularly useful to adopt this structure in the hook member 40 in which the hook portion 81 is provided facing the outside and is not visible from the inside of the cabin.

Since the hook portion 81 points toward the welded face 74a, it can be superposed on the welded face 74a in the up-down direction. This superposition can reduce the total size of the door-sash hook member 40 in the door width direction.

A procedure for attaching the hook member 40 to the door sash 20 will be described with reference to FIGS. 8A, 8B and subsequent figures.

Figure 8A:
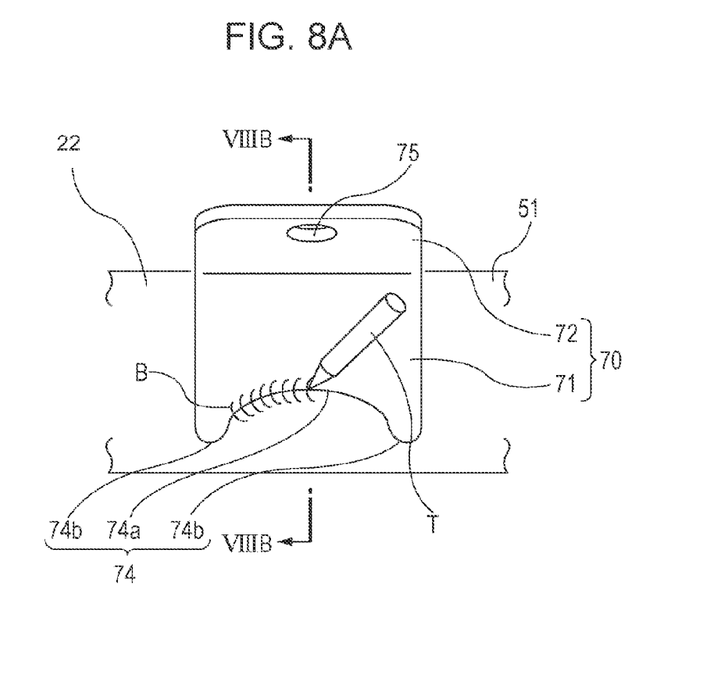
FIGS. 8A and 8B illustrate the operation provided when a hook-member main body is welded to the vehicular door sash of FIG. 1.

First, as illustrated in FIG. 8A, the hook-member body 70 is welded to the door sash 20. Welding is performed with a welding torch T. A welding method in which a weld bead B is formed, such as MIG welding or MAG welding, is adopted.

Figure 8B:
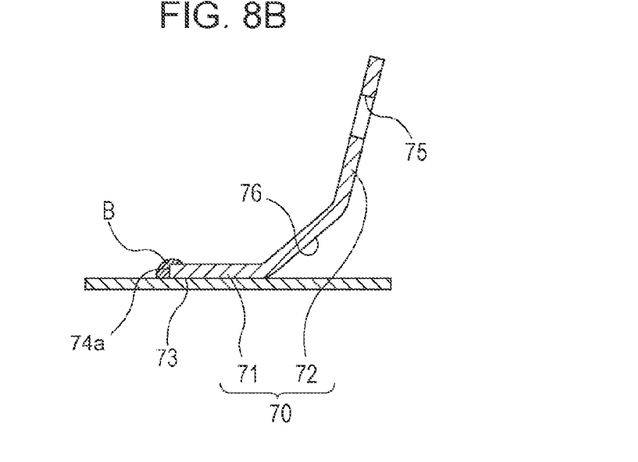

As illustrated in FIG. 8B, after welding, the weld bead B is normally protuberant to a position higher than the height of the welded face 74a. If the first cover body 80 (FIG. 2) is attached while the weld bead B remains protuberant, it is raised by a protuberant portion of the weld bead B, and this worsens the appearance. For this reason, it is necessary to scrape the protuberant portion of the weld bead B to the same height as that of the welded face 74a.

Figure 9A:
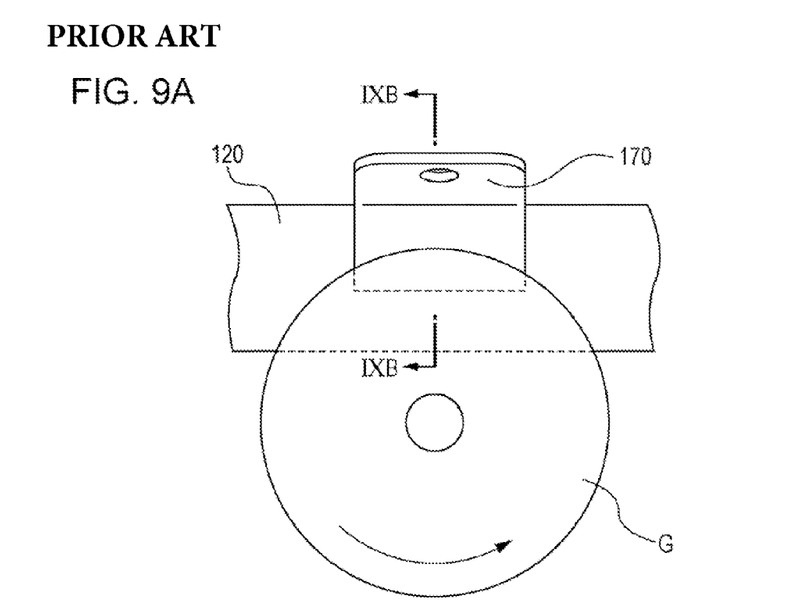
FIGS. 9A to 9C illustrate a problem of a hook-member main body in a comparative example.
Figure 9B:
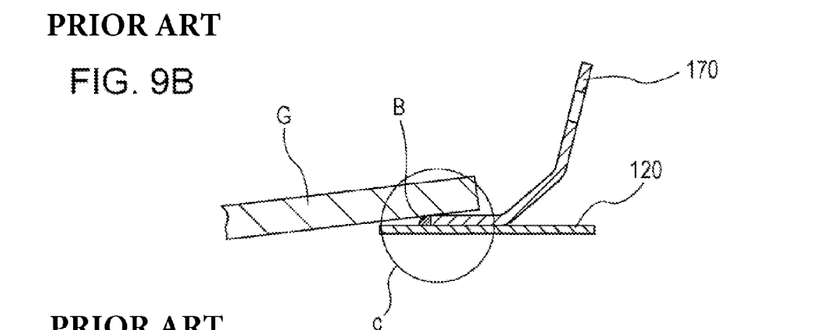
Figure 9C:
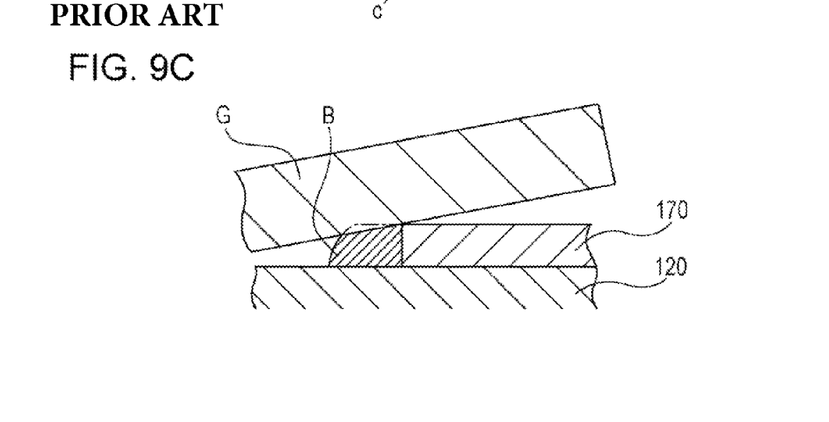

FIGS. 9A to 9C illustrate an operation of scraping a weld bead B in a comparative example. As illustrated in FIG. 9A, the weld bead B is scraped off with a device such as a grinder G. At this time, as illustrated in FIG. 9B serving as a cross-sectional view taken along line IXB-IXB of FIG. 9A, the grinder G sometimes tilts. As illustrated in FIG. 9C serving as an enlarged view of a section C in FIG. 9B, when the grinder G tilts, it scrapes off the weld bead B more than necessary. Further, when the grinder G tilts, it may come into contact with a door sash 120.

By scraping off the weld bead B more than necessary, the strength of the joint of a hook-member body 170 to the door sash 120 is decreased. When the grinder G comes into contact with the door sash 120, a contact mark sometimes remains on a surface of the door sash 120. The contact mark remaining on the surface of the door sash 120 worsens the appearance of the door sash 120.

Figure 10A:
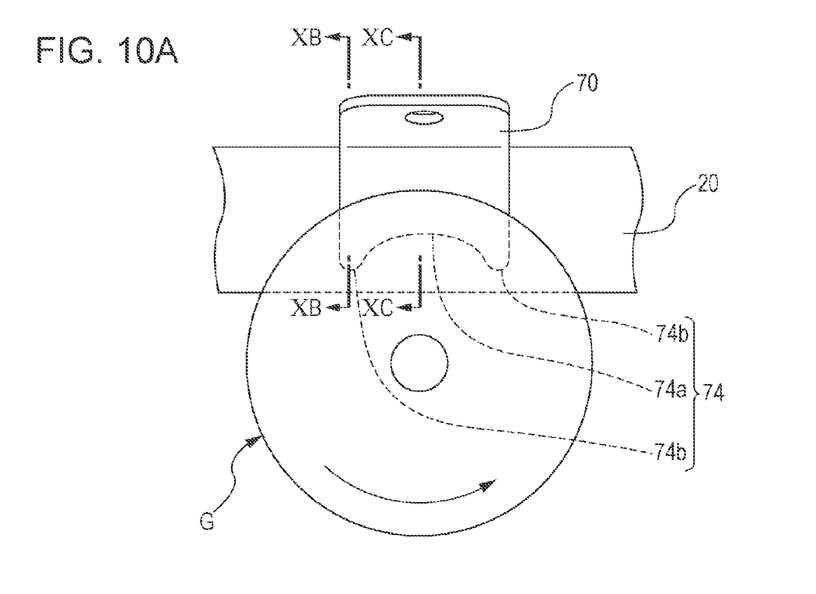
FIGS. 10A to 10C illustrate an advantage of the hook-member main body in the embodiment illustrated in FIG. 1.
Figure 10B:
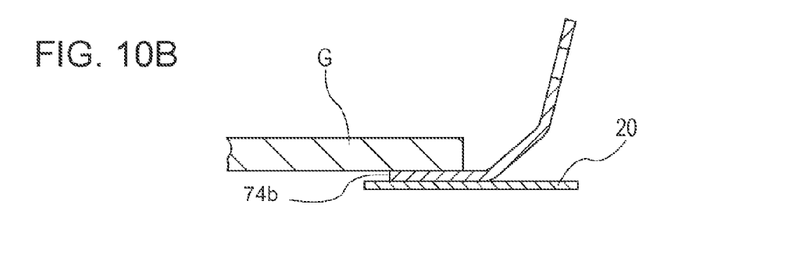
Figure 10C:
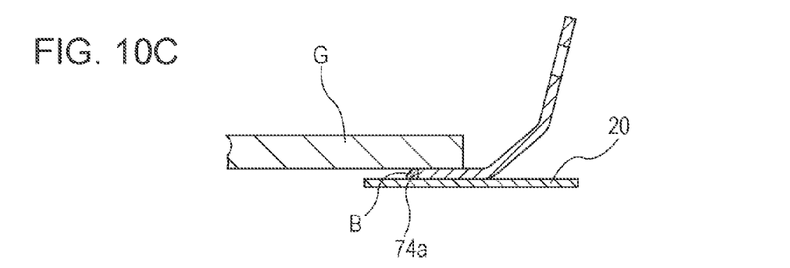

FIGS. 10A to 10C illustrate an operation of scraping a weld bead B in an example. As illustrated in FIG. 10A, in the example, a weld bead B is scraped with a device such as a grinder G, similarly to the comparative example. In the example, a hook-member body 70 has projecting portions 74b protruding outward from a welded face 74a along a superposed surface.

Thus, as illustrated in FIG. 10B serving as a cross-sectional view taken along line XB-XB of FIG. 10A, when the grinder G is tilted, it comes into contact with upper surfaces of the projecting portions 74b. That is, the upper surfaces of the projecting portions 74b can prevent the grinder G from tilting.

As illustrated in FIG. 10C serving as a cross-sectional view taken along line XC-XC of FIG. 10A, by preventing the grinder G from tilting, the weld bead B can be made flush with the height of the welded face 74a. By making the weld bead B flush with the welded face 74a, the design can be improved.

Further, by being prevented from tilting, the grinder G can also be prevented from contact with a door sash 20. This prevents a contact mark of the grinder G from remaining on the surface of the door sash 20.

Also referring to FIG. 2, the door-sash hook member 40 is attached to the door sash 20 by welding. Since the door-sash hook member 40 can be attached without forming a mounting hole in the door sash 20, it can be attached to the door sash 20 which is roll-formed. That is, the door-sash hook member 40 for the vehicular door can be attached regardless of a production method for the door sash 20.

The roll-formed door sash 20 is less expensive than a press-formed door sash. Since inexpensive door sash 20 is used in a wide area above the door body 11 (FIG. 1), the production cost of the vehicular door 10 (FIG. 1) can be reduced.

The extending portion 72 extends toward a direction opposite to the welded face 74a, and tilts in a direction to separate from the surface of the door sash 20 when the superposed surface 73 is superposed on the surface of the door sash 20. Since the extending portion 72 extends toward the direction opposite to the welded face 74a and tilts in the direction to separate from the surface of the door sash 20, it can be prevented from interfering with the grinder G when the weld bead B is scraped off with the grinder G. By preventing interference, the door-sash hook member 40 can be attached easily.

In addition, the welded face 74a is located on and welded to the surface of the door sash 20 such as to be adjacent to the opening of the angular U-shaped sectional portion 52 provided in the sash body 51. By being located adjacent to the opening of the angular U-shaped sectional portion 52 of the door sash 20, the welded face 74a can be located close to a comparatively wide space. By locating the welded face 74a close to the wide space, the weld bead B can be easily scraped off with the grinder G.

The scope of the disclosure is not limited to the foregoing embodiment, and various design changes can be made without departing from the scope of the disclosure. While the hook member of the present disclosure has been described by giving the hook for fixing the roller curtain as an example, it is also applicable to hooks used for other purposes, such as a hook on which a baggage is hung. That is, the engaged article to be hung on the hook member is not limited to these articles, and can be selected arbitrarily.

The door-sash hook member of the present disclosure is suitably attached to the rear door of the vehicle.

I claim:

1. A vehicular door-sash hook member to be attached to a surface of a metallic door sash of a vehicular door, the vehicular door-sash hook member comprising a hook member body made of metal, the hook member body comprising:
   a joint portion including a superposed surface superposed on the surface of the door sash; and
   a circumferential edge of the joint portion including a circumferential upright surface,
   wherein at least a part of the circumferential surface is a welding surface to be welded to the surface of the door sash with a welding material,
   wherein the welding surface is provided at one end of the joint portion, the hook member body further comprises:
   an extending portion provided at an opposite end of the joint portion opposite to the one end of the joint portion such that the superposed surface is located between the one end and the opposite end; and
   a hook portion provided in the extending portion,
   wherein the extending portion extends in a direction opposite to the welding surface,
   wherein the circumferential surface includes a projecting portion adjacent to the welding surface, and
   wherein the projecting portion protrudes along a plane of the superposed surface and protrudes outwardly compared to the welding surface.

2. The vehicular door-sash hook member according to claim 1, wherein the projecting portion includes a first projecting portion and a second projecting portion,
   wherein the first projecting portion is provided on one side of the welding surface and the second projecting portion is provided on an opposite side of the welding surface along the circumferential surface.

3. The vehicular door-sash hook member according to claim 2, wherein a center portion of the welding surface is recessed along the plane of the superposed surface.

4. The vehicular door-sash hook member according to claim 1, wherein
   the extending portion is inclined away from the plane of the superposed surface.

5. The vehicular door-sash hook member according to claim 4, wherein the hook portion points toward the welding surface.

6. A door sash for a vehicular door comprising:
   the vehicular door-sash hook member according to claim 1;
   a metallic sash body having a closed cross section; and
   a portion having an angular U-shaped cross section and provided to the sash body to support a run channel configured to guide a door glass, wherein the portion having the angular U-shaped cross section includes an opening at the top of a U-shape of the angular U-shaped cross section, and the hook member is provided on the surface of the door sash such that the welding surface is adjacent to the opening.

7. A door sash for a vehicular door comprising:
the vehicular door-sash hook member according to claim 2;
a metallic sash body having a closed cross section; and
a portion having an angular U-shaped cross section and provided to the sash body to support a run channel configured to guide a door glass,
wherein the portion having the angular U-shaped cross section includes an opening at the top of a U-shape of the angular U-shaped cross section, and the hook member is provided on the surface of the door sash such that the welding surface is adjacent to the opening.

8. A door sash for a vehicular door comprising:
the vehicular door-sash hook member according to claim 3;
a metallic sash body having a closed cross section; and
a portion having an angular U-shaped cross section and provided to the sash body to support a run channel configured to guide a door glass,
wherein the portion having the angular U-shaped cross section includes an opening at the top of a U-shape of the angular U-shaped cross section, and the hook member is provided on the surface of the door sash such that the welding surface is adjacent to the opening.

9. A door sash for a vehicular door comprising:
the vehicular door-sash hook member according to claim 4;
a metallic sash body having a closed cross section; and
a portion having an angular U-shaped cross section and provided to the sash body to support a run channel configured to guide a door glass,
wherein the portion having the angular U-shaped cross section includes an opening at the top of a U-shape of the angular U-shaped cross section, and the hook member is provided on the surface of the door sash such that the welding surface is adjacent to the opening.

10. A door sash for a vehicular door comprising:
the vehicular door-sash hook member according to claim 5;
a metallic sash body having a closed cross section; and
a portion having an angular U-shaped cross section and provided to the sash body to support a run channel configured to guide a door glass,
wherein the portion having the angular U-shaped cross section includes an opening at the top of a U-shape of the angular U-shaped cross section, and the hook member is provided on the surface of the door sash such that the welding surface is adjacent to the opening.

11. The vehicular door-sash hook member according to claim 3, wherein the welding surface is bent in an arc shape.

12. The vehicular door-sash hook member according to claim 2, wherein the hook member body includes the first projecting portion at one end thereof in a door width direction, and the second projecting portion at an other end thereof in the door width direction, and
wherein the welding surface extends to cover an entire portion of the circumferential surface located between the first projecting portion and the second projecting portion.

13. The vehicular door-sash hook member according to claim 12, wherein the welding surface is disposed between an outer end of the first projecting portion in the door width direction and an outer end of the second projecting portion in the door width direction.

14. The door sash for a vehicular door according to claim 6, wherein the superposed surface is disposed on a part of the sash body, the part having the closed cross section.

15. The vehicular door-sash hook member according to claim 4, wherein the hook member further comprises a hook member bead disposed at a position extending from the superposed surface to the extending portion, and
wherein the hook member bead protrudes away from the superposed surface.

16. The door sash for a vehicular door according to claim 6, wherein the welding surface is welded to the sash body.

17. The vehicular door-sash hook member according to claim 1, wherein the hook member further comprises a cover member, the cover member being a separate member from the hook member body, and
wherein the cover member covers an outer side of the hook member body with respect to a vehicle.

18. The vehicular door-sash hook member according to claim 2, wherein the hook member further comprises a cover member, the cover member being a separate member from the hook member body, and
wherein the cover member covers an outer side of the hook member body with respect to a vehicle.

19. The vehicular door-sash hook member according to claim 3, wherein the hook member further comprises a cover member, the cover member being a separate member from the hook member body, and
wherein the cover member covers an outer side of the hook member body with respect to a vehicle.

20. The vehicular door-sash hook member according to claim 4, wherein the hook member further comprises a cover member, the cover member being a separate member from the hook member body, and
wherein the cover member covers an outer side of the hook member body with respect to a vehicle.

21. A vehicular door-sash hook member to be attached to a surface of a metallic door sash of a vehicular door, the vehicular door-sash hook member comprising a hook member body made of metal, the hook member body comprising:
a joint portion including a superposed surface superposed on the surface of the door sash; and
a circumferential edge of the joint portion including a circumferential upright surface,
wherein at least a part of the circumferential surface is a welding surface to be welded to the surface of the door sash with a welding material,
wherein the circumferential surface includes a projecting portion adjacent to the welding surface, and
wherein the projecting portion protrudes along a plane of the superposed surface and protrudes outwardly compared to the welding surface,
wherein the projecting portion includes a first projecting portion and a second projecting portion, wherein the first projecting portion is provided on one side of the welding surface and the second projecting portion is provided on an opposite side of the welding surface along the circumferential surface, and
wherein a center portion of the welding surface is recessed along the plane of the superposed surface.

22. A door sash for a vehicular door comprising:
a vehicular door-sash hook member;
a metallic sash body having a closed cross section; and
a portion having an angular U-shaped cross section and provided to the sash body to support a run channel configured to guide a door glass, wherein the vehicular door-sash hook member comprises a hook member body made of metal, the hook member body comprising:
- a joint portion including a superposed surface superposed on a surface of the door sash; and
- a circumferential edge of the joint portion including a circumferential upright surface, wherein at least a part of the circumferential surface is a welding surface to be welded to the surface of the door sash with a welding material, wherein the circumferential surface includes a projecting portion adjacent to the welding surface, wherein the projecting portion protrudes along a plane of the superposed surface and protrudes outwardly compared to the welding surface, wherein the portion having the angular U-shaped cross section includes an opening at the top of a U-shape of the angular U-shaped cross section, and the hook member is provided on the surface of the door sash such that the welding surface is adjacent to the opening, and wherein the superposed surface is disposed on a part of the sash body, the part having the closed cross section.

* * * * *